(12) United States Patent
Edwards et al.

(10) Patent No.: US 6,826,213 B1
(45) Date of Patent: Nov. 30, 2004

(54) COMPONENT INTERCONNECT APPARATUS

(76) Inventors: Phillip J. Edwards, 6721 Positano Ln., San Jose, CA (US) 95138; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 62 days.

(21) Appl. No.: 10/044,653

(22) Filed: Jan. 11, 2002

Related U.S. Application Data

(60) Provisional application No. 60/275,002, filed on Mar. 12, 2001.

(51) Int. Cl.[7] ................................................ H01S 3/04
(52) U.S. Cl. .............................. 372/36; 385/56; 385/88
(58) Field of Search ............................... 372/36; 385/56

(56) References Cited

U.S. PATENT DOCUMENTS

| | | | | |
|---|---|---|---|---|
| 5,815,623 | A | * | 9/1998 | Gilliland et al. ............... 385/93 |
| 5,897,728 | A | * | 4/1999 | Cole et al. ................... 156/155 |
| 5,940,562 | A | * | 8/1999 | Henson et al. ................. 385/88 |
| 6,187,678 | B1 | * | 2/2001 | Gaynes et al. ............... 438/667 |
| 6,221,690 | B1 | * | 4/2001 | Taniguchi et al. ........... 438/106 |
| 6,404,960 | B1 | * | 6/2002 | Hibbs-Brenner et al. ..... 385/52 |
| 2002/0031313 | A1 | * | 3/2002 | Williams ...................... 385/92 |
| 2002/0101816 | A1 | * | 8/2002 | Braitberg et al. ........... 369/291 |
| 2002/0114589 | A1 | * | 8/2002 | Igl et al. ........................ 385/88 |
| 2002/0191910 | A1 | * | 12/2002 | Gallup et al. ................. 385/33 |
| 2003/0103740 | A1 | * | 6/2003 | Edwards et al. ............. 385/94 |

* cited by examiner

*Primary Examiner*—Don Wong
*Assistant Examiner*—Dung Nguyen
(74) *Attorney, Agent, or Firm*—Parsons & Goltry; Robert A. Parsons; Michael W. Goltry

(57) ABSTRACT

Optical component mounting and interconnect apparatus includes a base formed of at least one layer of insulating material defining first and second opposed major surfaces. A plurality of vias extend through the base. The vias include a signal via and two spaced apart ground vias parallel with and on opposite sides of the signal via. The two ground vias are connected to ground to form a transmission line with the signal via. An optical component is mounted on the first major surface of the base with an electrical terminal affixed to one end of the signal via and a flex circuit is affixed to the second major surface of the base with an electrical connection to the opposite end of the signal via.

14 Claims, 3 Drawing Sheets

COMPONENT INTERCONNECT APPARATUS

CROSS-REFERENCE TO RELATED APPLICATION

This application claims the benefit of provisional application Ser. No. 60/275,002, filed 12 Mar. 2001.

FIELD OF THE INVENTION

This invention relates to components used in optoelectric modules and the like.

More particularly, the present invention relates to interconnect apparatus between various components used in such modules and other electronic equipment.

BACKGROUND OF THE INVENTION

In optical-to-electrical and electrical-to-optical (hereinafter "optoelectric") modules used in the various communications fields, one of the most difficult problems that must be solved is the efficient transmission of light between a light generating device and an optical fiber or, alternatively, the transmission of light from the optical fiber to a light receiving device. Providing this efficient transmission requires very precise assembly procedures. Here it will be understood by those skilled in the art that the term "light" is a generic term which includes any electromagnetic radiation that can be modulated and transmitted by optical fibers or other optical transmission lines.

Much of the optoelectric module fabrication difficulty and expense is due to mounting difficulties of optical components, such as lasers, light emitting diodes, photodiodes, etc. Generally, there are two types of lasers that are used in optoelectric modules, edge emitting lasers and surface emitting lasers. Edge emitting lasers emit light in a path parallel to the mounting surface while surface emitting lasers emit light perpendicular to the mounting surface. The light from either of the lasers must then be directed into an optical fiber for transmission to a remotely located light receiver (i.e., a photodiode or the like). Lens systems are used at both ends of the optical fiber to direct light from a light generating component into the optical fiber and to direct light from the optical fiber onto a light sensing component. The apparatus used to mount the optical components and the lens systems can have a substantial effect on the construction of the optical systems and the assembly procedures for the optical systems. Also, the mounting structure for the optical components and the lens system must be very rugged and stable so that alignment is not disturbed by use or temperature changes.

It would be highly advantageous, therefore, to remedy the foregoing and other deficiencies inherent in the prior art.

Accordingly, it is an object the present invention to provide new and improved optical component mounting and interconnect apparatus.

Another object of the present invention is to provide new and improved optical component mounting and interconnect apparatus which is rugged and stable.

And another object of the present invention is to provide new and improved optical component mounting and interconnect apparatus which improve the fabrication efficiency and manufacturing capabilities of optoelectric modules.

Still another object of the present invention is to provide new and improved optical component mounting and interconnect apparatus which allows the use of a variety of optical components and component materials.

Another object of the present invention is to provide new and improved component mounting and interconnect apparatus which is capable of communicating high frequencies between components and connecting circuits.

Still another subject of the present invention is to provide new and improved component mounting and interconnect apparatus which is designed to reduce outside interference with the desired signal.

Another object of the present invention is to provide new and improved component mounting and interconnect apparatus that can have a fixed impedance which, upon matching to components or circuitry, further increase the efficiency of the coupling.

SUMMARY OF THE INVENTION

Briefly, to achieve the desired objects of the present invention in accordance with a preferred embodiment thereof, provided is optical component mounting and interconnect apparatus including a base formed of at least one layer of insulating material. At least one via extends through the one layer. An optical component mounted on the first major surface of the base has an electrical terminal coupled to one end of the via and a flex circuit is affixed to the second major surface of the base with an electrical connection to the opposite end of the via.

In a more specific embodiment, the component mounting and interconnect apparatus includes a base formed of at least one layer of insulating material defining first and second opposed major surfaces with a plurality of vias extending from the first major surface to the second major surface. The plurality of vias include a signal via and two spaced apart ground vias parallel with and on opposite sides of the signal via, whereby the signal via and two ground vias form a transmission line. An electrical component is mounted on the first major surface of the base with an electrical terminal affixed to one end of the signal via and a circuit is affixed to the second major surface of the base with an electrical connection to the opposite end of the signal via, whereby the transmission line communicates signals between the component and the circuit.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
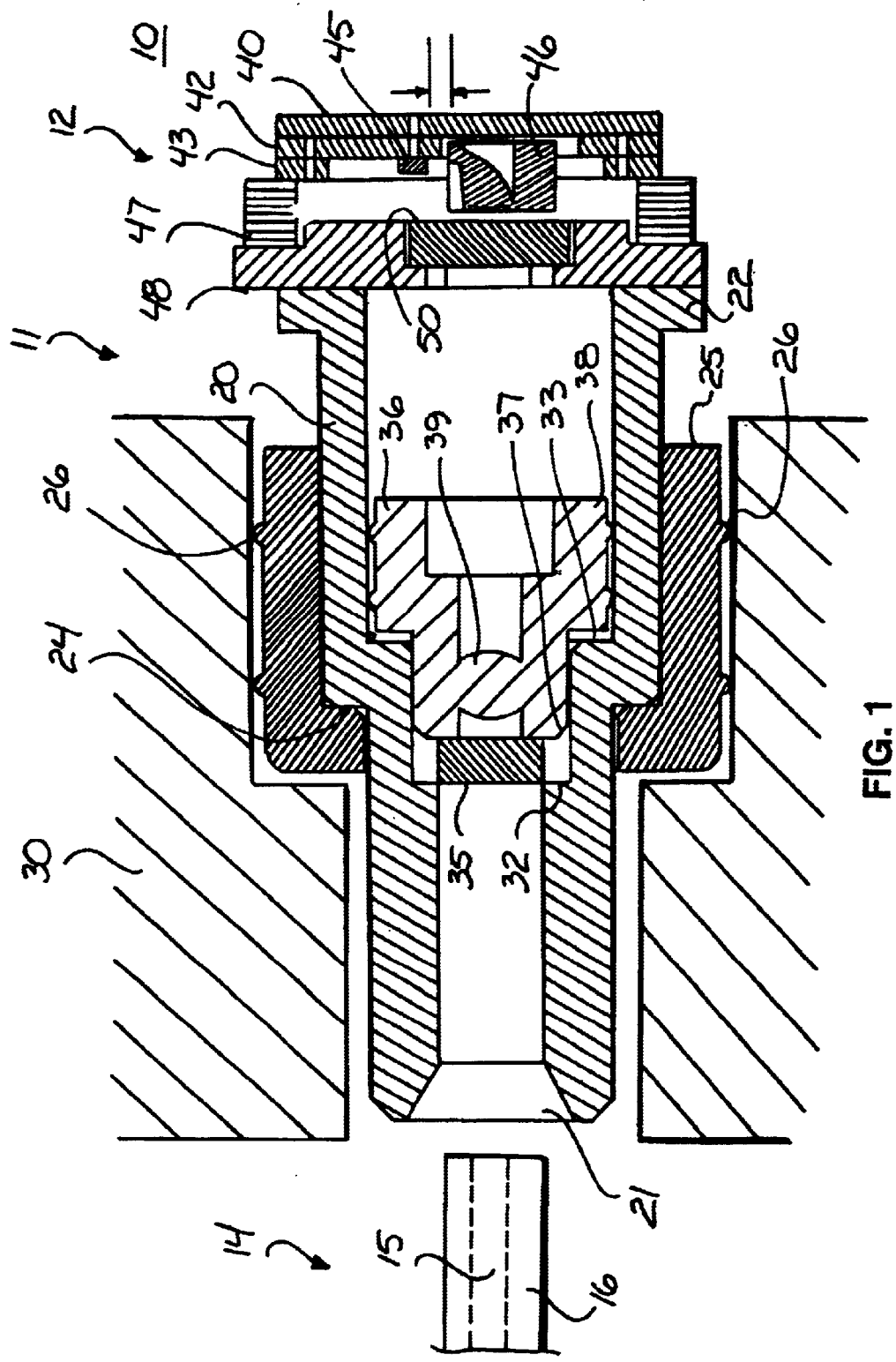
FIG. 1 is a sectional view of a simplified optoelectric module in accordance with the present invention.

The present invention provides new and improved mounting features for telecommunication and data communication apparatus and the like and in particular for optoelectric modules. Turning to FIG. 1, a sectional view is illustrated of a simplified optoelectric module 10 in accordance with the present invention. As stated above, the term "optoelectric" is used herein to denote the fact that module 10 can be either an optical-to-electrical or electrical-to-optical module.

It will be understood by those skilled in the art that modules of the type discussed herein generally include a pair of channels, one of which receives electrical signals, converts the electrical signals to optical (light) beams by way of a laser or the like and introduces them into one end of an optical fiber, which then transmits the modulated optical beams to external apparatus. The second channel of the module receives modulated optical beams from an optical fiber connected to the external apparatus, conveys the modulated optical beams to a photo diode or the like, which converts them to electrical signals. In the following description, the apparatus and methods can generally be used in either of the channels but, since the optical portions of the two channels are substantially similar, only one channel will be discussed with the understanding that the description applies equally to both channels. Also, throughout this disclosure, unless a specific component is described, the term "laser" is intended to denote any light source including, for example, a laser, a light emitting diode, the end of a light communicating optical fiber, etc. and light receiving structures are intended to include any one of a photo-diode, a pin diode, an end of a light communicating optical fiber, etc.

Module 10 of FIG. 1 includes a receptacle element or assembly 11 and an optoelectric element or package 12 aligned and affixed together, as will be disclosed in more detail below. Receptacle assembly 11 is designed to receive an optical fiber 14 in communication therewith, in a manner that will become clear presently. In the preferred embodiment, optical fiber 14 is a single mode fiber (the use of which is one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Progressing from the end of module 10 which defines opening 21 toward the end defining flange 22, ferrule 20 has two radially outwardly directed steps 32 and 33. Step 32 provides a surface or stop for the mounting of an optical spacer 35 and step 33 provides a surface or a stop for the positioning of an optical lens assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. Similarly, the term "glass" is defined as any material that is substantially temperature insensitive (i.e., stable throughout the operating temperature of the module), such as glass, crystalline material, or semiconductor material (e.g. silicon, oxides, nitrides, some ceramics, etc.). For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough which extends from an end 37 to an opposite end 38. A lens 39 is integrally formed in the central opening a fixed distance from end 37. Lens assembly 36 is frictionally held in place within ferrule 20 and in this embodiment holds spacer 35 fixedly in place. In other embodiments, lens assembly 36 may be moveable along the Z or optical axis a limited distance. Also, lens 39 is spaced a fixed distance from spacer 35. In this preferred embodiment, optical fiber 14 is inserted into ferrule 20 so that glass core 15 buts against spacer 35, which substantially reduces or suppresses return reflections.

Optoelectric package 12 includes a base 41 comprising (in this example) a support plate 40 and a mounting plate 42 positioned thereon. One or more spacer rings 43 may be positioned on plate 42 to provide sufficient distance for components mounted thereon. In this example a laser 45 is mounted on the upper surface of mounting plate 42 and positioned to transmit light generated therein to a lens block 46. Alternatively, laser 45 could be a photodiode or the like. Lens block 46 is mounted on mounting plate 42 by some convenient means, such as outwardly extending ears (not shown).

Laser 45 is mounted to one side of the optical axis Z, defined by optical fiber 14 and lens 39. Lens block 46 is constructed to define a lens with a curved reflecting surface designed to direct impinging light, received at an angle to the Z axis, along the Z axis and to collimate the impinging light. Additional lenses may be formed, if desired, in either or both of the inlet surface and the outlet surface of lens block 46. Lens block 46 can be molded from plastic or it can be formed to fixedly mount a glass curved reflecting surface in a fixed position relative to laser 45. A distance d is the distance between laser 45 and the curved reflecting surface of lens block 46.

A ring 47 is positioned on spacer rings 43 and a cap or cover 48 is affixed to ring 47. Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which the laser or photodiode used is either separately sealed or is not sensitive to atmospheric conditions.

A window 50 is sealed in cover 48 so as to be aligned with lens block 46. Lens block 46 redirects light from laser 45 at a ninety degree angle out through window 50, which may include one or more lenses or optical surfaces. Further, window 50 is affixed to the underside of cover 48 by some convenient means, such as epoxy or other adhesive, so as to hermetically seal the light transmitting opening through cover 48. If a hermetic seal is not required, window 50 can be formed (e.g. molded) from plastic. Lens block 46 may be molded from plastic for convenience in manufacturing.

Optoelectric package 12 is affixed to receptacle assembly 11 with flange 22 of ferrule 20 butting against the upper surface of cover 48. Further, optoelectric package 12 is optically aligned with receptacle assembly 11 so that light from laser 45 is directed into core 15 of optical fiber 14. This alignment can be accomplished in different ways but one reliable method is known as active alignment. In this process, laser 45 is activated and receptacle assembly 11 is positioned approximately over optoelectric package 12. The light in optical fiber 14 is measured and the alignment is adjusted for maximum light. When maximum light is measured alignment has been achieved and receptacle assembly 11 is fixed to optoelectric package 12 by some convenient means, such as welding or adhesive.

Figure 2:
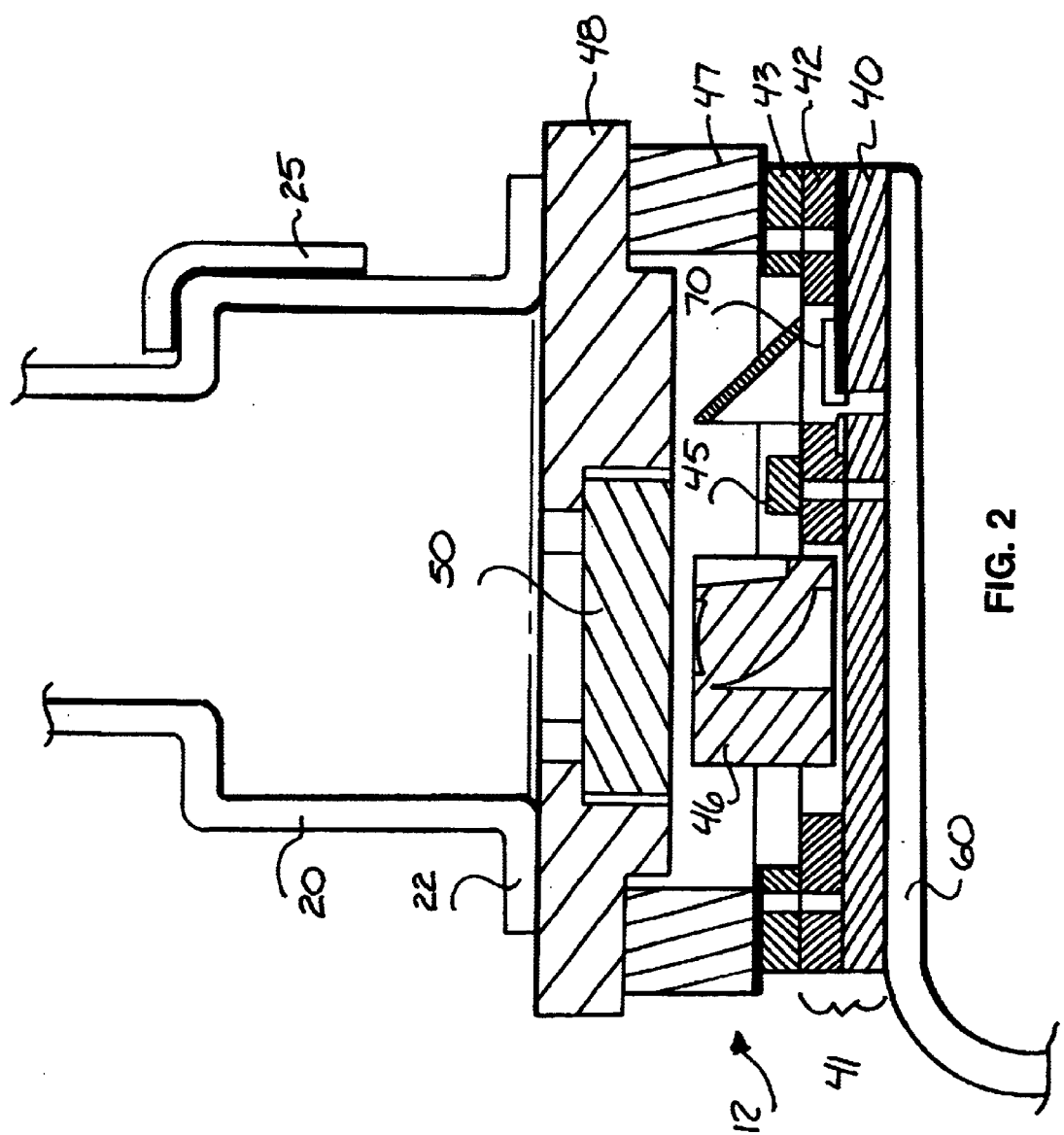
FIG. 2 is an enlarged sectional view of the optoelectric package of the optical/electrical module of FIG. 1.

Turning now to FIG. 2, an enlarged sectional view of optoelectric package 12 is illustrated. While optoelectric package 12 is illustrated with a base 41 including support plate 40 and mounting plate 42, it will be understood that base 41 can include any number of layers from one to several and may be formed of any non-conducting material which is sufficiently hard to provide the necessary support and rigidity for maintaining alignment. In this disclosure the term "base" is intended to be generic for any type of support, e.g. plastic, layered board, layered or solid sheets of ceramic, semiconductor substrates, etc. Also, a flex circuit 60 is shown connected to the lower surface of support plate 40 of package 12. In this embodiment, for the transmitting module 10, flex circuit 60 couples laser 45 and a monitor diode 70 (if present) to circuits (e.g. drivers, amplifiers, etc.) on a printed circuit board, not shown. Similarly, for a receiving module (not shown), a flex circuit couples the photodiode to circuits on the printed circuit board. Electrical connections between flex circuit 60 and the various components in optoelectric package 12 are made directly through base 41.

Figure 3:
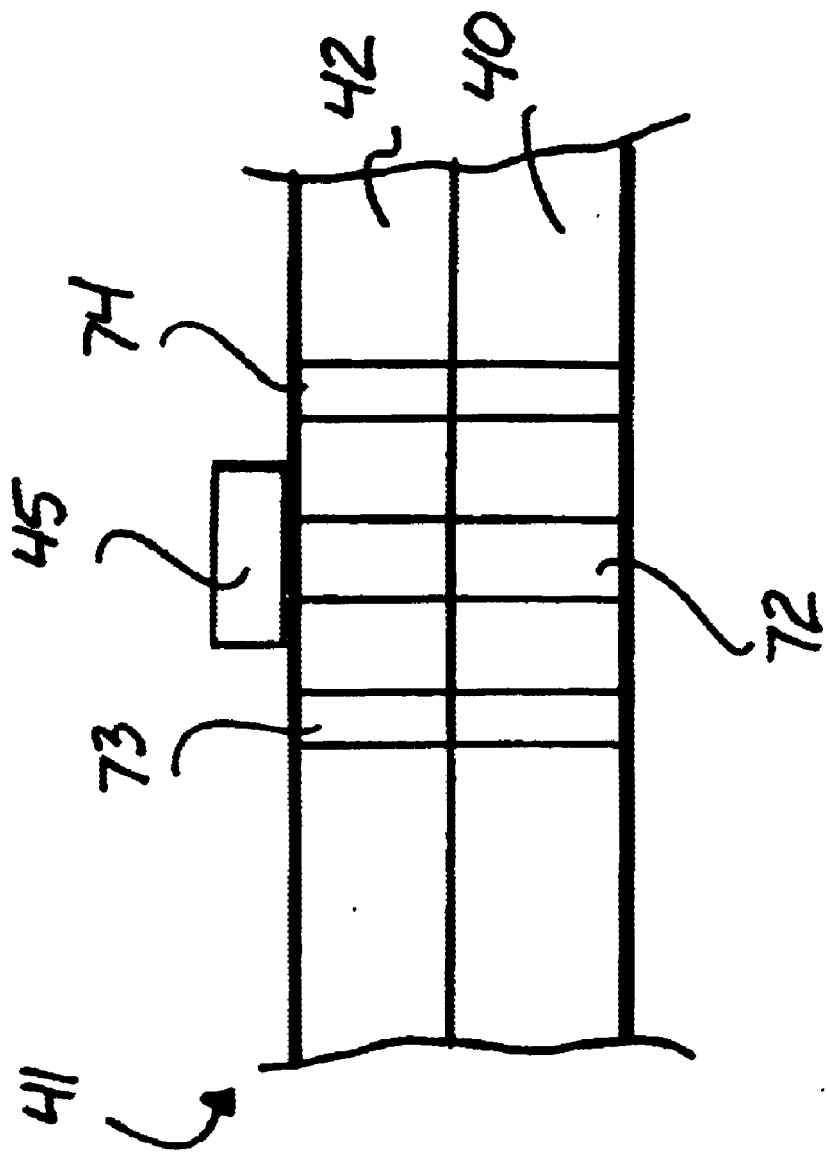
FIG. 3 is a simplified sectional view of a transmission line connection to the optoelectric package.

Turning to FIG. 3, specific apparatus for coupling components (e.g. laser 45) in optoelectric package 12 is illustrated. In this structure parallel sets of adjacent through-holes or vias 72, 73, and 74 are provided through base 41. All three of the vias are plated (but could be filled with solder or other conductive material in some embodiments) and the centrally located via 72 is connected to one terminal of laser 45. Vias 73 and 74 are plated (but could be filled with solder or other conductive material) and connected to ground at one or both ends.

Because of the proximity of the three vias 72, 73, and 74, the signal via 72 with the ground vias 73 and 74 on either side operate as a transmission line for high frequencies. Transmission lines of this type are very efficient for coupling electrical signal between a component and other circuitry. Further, the ground lines on either side of the signal line prevent any interference with the signal. Coupling transmission lines of this type can be used in various other circuits to connect components together or to other circuits. Further, as a transmission line the three vias 72, 73, and 74 can have a fixed impedance which, upon matching to components or circuitry further increase the efficiency of the coupling.

It should be noted that the formation of vias in the base allows the mounting of optical components, e.g., laser 45, directly on the base which substantially improves the ruggedness of the structure and the stability of the optical alignment. Further, the size of the vias can be selected to allow limited movement of the optical components during the initial positioning and mounting so that manufacturing tolerances of the base can be eased substantially. Also, because of the positioning of the optical components directly on the base, machine assembly (e.g., pick and place machines) can be more easily adapted to the assembly process.

Accordingly, new and improved mounting and interconnect features are disclosed which substantially reduce time and effort in assembly and alignment procedures and which improve the efficiency of optical systems. Thus, manufacturing tolerances can be substantially reduced, substantially reducing manufacturing time, labor, and costs. Further, the new and improved mounting and interconnect features allow the use of a variety of components and component materials.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is.

What is claimed is:

1. Optical component mounting and interconnect apparatus comprising:

an electrically insulated base with first and second opposed major surfaces;

a signal via and a ground via positioned adjacent to each other in the base and extending through the base between the first and second opposed major surfaces, the signal via and the ground via each containing electrically conductive material forming electrical conductors from the first major surface to the second major surface, and the ground via being connected to ground, the signal via and the ground via being positioned to form a high frequency transmission line;

an optical component having an electrical terminal, the optical component mounted on the first major surface of the base with the electrical terminal coupled to the signal via; and a flex circuit affixed to the second major surface of the base with an electrical connection to the signal via, the signal via and the ground via forming the high frequency transmission line providing a fixed impedance matched to at least one of the optical component and the flex circuit.

2. Optical component mounting and interconnect apparatus as claimed in claim 1 wherein the base includes three spaced apart vias including a signal via and two ground vias parallel with and on opposite sides of the signal via, the signal via being coupled at one end to the electrical terminal of the optical component and at an opposite end to the flex circuit, and the two ground vias being connected to ground, the signal via and two ground vias forming a high frequency transmission line with a fixed impedance matched to at least one of the optical component and the flex circuit.

3. Optical component mounting and interconnect apparatus as claimed in claim 1 wherein the base includes one of plastic, layered board, layered sheets of ceramic, solid ceramic, and semiconductor substrate.

4. Optical component mounting and interconnect apparatus as claimed in claim 1 wherein the optical component includes an edge emitting laser.

5. Optical component mounting and interconnect apparatus as claimed in claim 4 further including a lens block mounted on the first major surface of the base adjacent the edge emitting laser so as to receive light from the edge emitting laser and redirect the light in a direction substantially perpendicular to the first major surface.

6. Optical component mounting and interconnect apparatus comprising:

a base including at least one layer of insulating material defining first and second opposed major surfaces with a plurality of vias extending from the first major surface to the second major surface, the plurality of vias including a signal via having a first end in the first major surface and a second end in the second major surface and a ground via having a first end in the first major surface and a second end in the second major surface, the ground via being positioned adjacent the signal via so that the signal via and the ground via form a high frequency transmission line;

an optical component having an electrical terminal, the optical component mounted on the first major surface of the base with the electrical terminal affixed to the first end of the signal via; and a flex circuit affixed to the second major surface of the base with an electrical connection to the second end of the signal via, the signal via and the ground via forming the high frequency transmission line providing a fixed impedance matched to at least one of the optical component and the flex circuit.

7. Optical component mounting and interconnect apparatus as claimed in claim 6 wherein the plurality of vias includes three spaced apart vias including the signal via and two ground vias parallel with and on opposite sides of the signal via, the two ground vias being connected to ground, the signal via and two ground vias forming a high frequency transmission line with a fixed impedance matched to at least one of the optical component and the flex circuit.

8. Optical component mounting and interconnect apparatus as claimed in claim 6 wherein the base includes one of plastic, layered board, layered sheets of ceramic, solid ceramic, and semiconductor substrate.

9. Optical component mounting and interconnect apparatus as claimed in claim 6 wherein the optical component includes an edge emitting laser.

10. Optical component mounting and interconnect apparatus as claimed in claim 9 further including a lens block mounted on the first major surface of the base adjacent the edge emitting laser so as to receive light from the edge emitting laser and redirect the light in a direction substantially perpendicular to the first major surface.

11. Component mounting and interconnect apparatus comprising:

a base including at least one layer of insulating material defining first and second opposed major surfaces with a plurality of vias extending from the first major surface to the second major surface, the plurality of vias including a signal via having a first end in the first major surface and a second end in the second major surface and two spaced apart ground vias parallel with and on opposite sides of the signal via, the two ground vias being connected to ground, the signal via and two ground vias being positioned to form a high frequency transmission line;

a component having an electrical terminal, the component mounted on the first major surface of the base with the electrical terminal affixed to the first end of the signal via; and a circuit affixed to the second major surface of the base with an electrical connection to the second end of the signal via, the signal via and the two ground vias forming the high frequency transmission line providing a fixed impedance matched to at least one of the component and the circuit, whereby the high frequency transmission line communicates signals between the component and the circuit.

12. Component mounting and interconnect apparatus as claimed in claim 11 wherein the base includes one of plastic, layered board, layered sheets of ceramic, solid ceramic, and semiconductor substrate.

13. Component mounting and interconnect apparatus as claimed in claim 11 wherein the component includes an edge emitting laser.

14. Component mounting and interconnect apparatus as claimed in claim 13 further including a lens block mounted on the first major surface of the base adjacent the edge emitting laser so as to receive light from the edge emitting laser and redirect the light in a direction substantially perpendicular to the first major surface.

* * * * *